(12) United States Patent
Yoo et al.

(10) Patent No.: US 11,302,959 B2
(45) Date of Patent: Apr. 12, 2022

(54) ELECTROLYTE FOR LITHIUM METAL BATTERY AND LITHIUM METAL BATTERY INCLUDING THE SAME

(71) Applicant: SAMSUNG SDI CO., LTD., Yongin-si (KR)

(72) Inventors: Heeeun Yoo, Yongin-si (KR); Duckhyun Kim, Yongin-si (KR); Taeri Kwon, Yongin-si (KR); Taehyun Bae, Yongin-si (KR); Woocheol Shin, Yongin-si (KR); Minju Lee, Yongin-si (KR); Siyoung Cha, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 280 days.

(21) Appl. No.: 16/327,050

(22) PCT Filed: Aug. 3, 2017

(86) PCT No.: PCT/KR2017/008404
§ 371 (c)(1),
(2) Date: Feb. 21, 2019

(87) PCT Pub. No.: WO2018/038417
PCT Pub. Date: Mar. 1, 2018

(65) Prior Publication Data
US 2019/0198923 A1    Jun. 27, 2019

(30) Foreign Application Priority Data

Aug. 22, 2016  (KR) .................. 10-2016-0106180

(51) Int. Cl.
*H01M 10/0565* (2010.01)
*H01M 4/131* (2010.01)
(Continued)

(52) U.S. Cl.
CPC ....... *H01M 10/0565* (2013.01); *H01M 4/131* (2013.01); *H01M 4/364* (2013.01);
(Continued)

(58) Field of Classification Search
CPC ......... H01M 10/0525; H01M 10/0565; H01M 4/131; H01M 4/48; H01M 4/483;
(Continued)

(56) References Cited

U.S. PATENT DOCUMENTS 4,654,279 A    3/1987  Bauer
5,016,991 A    5/1991  Mason
(Continued)

FOREIGN PATENT DOCUMENTS

KR         10-0254845          11/1996
KR       10-1998-0006594        3/1998
(Continued)

OTHER PUBLICATIONS

T. Mandai et al. Criteria for Solvate Ionic Liquids, Phys. Chem. Phys, 2014., 16 8761-8772.
(Continued)

*Primary Examiner* — Karie O'Neill Apicella
(74) *Attorney, Agent, or Firm* — Lee IP Law, PC

(57) ABSTRACT

Provided are an electrolyte for a lithium metal battery and a lithium metal battery including the electrolyte, wherein the electrolyte includes a composite including a lithium ion-conductive compound which is a non-carbonate-based substance having resistance to reduction of lithium metal, a polymerization product of a crosslinkable polymer, and a lithium salt, wherein the lithium ion-conductive compound is glycol ether.

20 Claims, 14 Drawing Sheets

(51) Int. Cl.
*H01M 4/36* (2006.01)
*H01M 4/40* (2006.01)
*H01M 4/48* (2010.01)
*H01M 10/0525* (2010.01)
*H01M 4/38* (2006.01)
*H01M 4/58* (2010.01)
*H01M 10/052* (2010.01)
*H01M 10/056* (2010.01)

(52) U.S. Cl.
CPC ........... *H01M 4/382* (2013.01); *H01M 4/405* (2013.01); *H01M 4/483* (2013.01); *H01M 4/5825* (2013.01); *H01M 10/052* (2013.01); *H01M 10/056* (2013.01); *H01M 10/0525* (2013.01); *H01M 2300/0022* (2013.01); *H01M 2300/0068* (2013.01); *H01M 2300/0082* (2013.01); *H01M 2300/0085* (2013.01); *H01M 2300/0091* (2013.01)

(58) Field of Classification Search
CPC .......... H01M 4/40; H01M 4/405; H01M 4/36; H01M 4/364
See application file for complete search history.

(56) References Cited

U.S. PATENT DOCUMENTS

| | | | |
|---|---|---|---|
| 5,755,985 A * | 5/1998 | Vallee | C08F 216/12 252/62.2 |
| 7,646,171 B2 | 1/2010 | Mikhaylik | |
| 8,852,815 B2 | 10/2014 | Kwon et al. | |
| 9,306,240 B2 | 4/2016 | Lee et al. | |
| 9,911,984 B2 * | 3/2018 | Tamirisa | H01M 6/18 |
| 10,468,718 B2 | 11/2019 | Lee et al. | |
| 2005/0003276 A1 | 1/2005 | Sakai et al. | |

FOREIGN PATENT DOCUMENTS

| | | | |
|---|---|---|---|
| KR | 10-0229600 | | 8/1999 |
| KR | 1999-0084542 | | 12/1999 |
| KR | 10-2001-0037163 | | 5/2001 |
| KR | 10-2004-0026370 | | 3/2004 |
| KR | 10-2004-0063938 | | 7/2004 |
| KR | 10-2005-0024921 | | 3/2005 |
| KR | 10-2006-0127973 | | 12/2006 |
| KR | 10-2012-0084572 | | 7/2012 |
| KR | 10-2013-0142224 | | 12/2013 |
| KR | 10-2016-0034173 | A | 3/2016 |
| KR | 10-2016-0056423 | A | 5/2016 |

OTHER PUBLICATIONS

International Search Report—PCT/KR2017/008404 dated Nov. 9, 2017.
Korean Office action dated Oct. 26, 2020.

* cited by examiner

ELECTROLYTE FOR LITHIUM METAL BATTERY AND LITHIUM METAL BATTERY INCLUDING THE SAME

CROSS-REFERENCE TO THE RELATED APPLICATION

This is the U.S. national phase application based on PCT Application No. PCT/KR2017/008404, filed Aug. 3, 2017, which is based on Korean Patent Application No. 10-2016-0106180, filed Aug. 22, 2016, the entire contents of all of which are hereby incorporated by reference.

TECHNICAL FIELD

The present disclosure relates to an electrolyte for a lithium metal battery and a lithium metal battery including the electrolyte.

BACKGROUND ART

In accordance with the rapid development of the electrical, electronics, telecommunications, and computer industries, demand for secondary batteries having improved performance and improved safety has recently rapidly increased. Particularly, along with the trends towards lighter, slimmer, and more compact electrical and electronic products with improved portability, there has been demand for lighter and smaller secondary batteries as core components thereof. Further, due to concerns about environmental pollution problems such as air pollution and noise pollution from the mass distribution of automobiles, and the increasing need for new energy supply sources in view of the depletion of oil, the need for the development of electric vehicles as a solution to such problems has increased, and as power sources of these electric vehicles, the development of batteries with improved power output and improved energy density is needed. Recently, lithium metal batteries have received significant attention as one of the new advanced high-performance next-generation batteries meeting such needs. Lithium available as a negative electrode material having low density and low standard reduction potential is also drawing attention as an electrode material for high-energy-density batteries.

DESCRIPTION OF EMBODIMENTS

Technical Problem

The present disclosure provides an electrolyte for a lithium metal battery, the electrolyte capable of ensuring sufficient ionic conductivity for operation of a battery at a low temperature.

The present disclosure provides a lithium metal battery having improved cell performance by inclusion of the above-described electrolyte.

Solution to Problem

According to an aspect of the present disclosure, there is provided an electrolyte for a lithium metal battery, the electrolyte including a composite, wherein the composite includes a lithium ion-conductive compound which is a non-carbonate-based substance having resistance to reduction of lithium metal, a polymerization product of a crosslinkable polymer, and a lithium salt, wherein the lithium ion-conductive compound is glycol ether.

According to another aspect of the present disclosure, there is provided a lithium metal battery including: a lithium negative electrode including a lithium metal or a lithium metal alloy; a positive electrode; and the above-described electrolyte between the lithium negative electrode and the positive electrode.

Advantageous Effects of Disclosure

According to one or more embodiments, an electrolyte for a lithium metal battery may have improved mechanical strength and ionic conductivity. A lithium metal battery having an improved cycle life may be manufactured using the electrolyte.

MODE OF DISCLOSURE

Hereinafter, example embodiments of an electrolyte for a lithium metal battery, a method of preparing the electrolyte, and a lithium metal battery having improved cell performance by use of the electrolyte will be described in greater detail with reference to the appended drawings.

According to an aspect of the present disclosure, there is provided an electrolyte for a lithium metal battery, the electrolyte including a composite, wherein the composite includes a lithium ion-conductive compound which is a non-carbonate-based substance having resistance to reduction of lithium metal, a polymerization product of a crosslinkable polymer, and a lithium salt, wherein the lithium ion-conductive compound is glycol ether.

As an electrolyte for a lithium metal battery using a lithium metal negative electrode, a polyethylene oxide electrolyte or a polyethylene-polystyrene copolymer electrolyte may be generally used.

The polyethylene oxide electrolyte may ensure sufficient lithium ion conductivity to enable charging and discharging at high temperatures but may also have reduced ionic conductivity at a temperature of about 80° C. or less due to crystallization of polyethylene oxide, and thus charge-discharge performance of a battery may be significantly reduced, making operation of the battery difficult. Thus, in such a lithium metal battery using the polyethylene oxide electrolyte, the operation temperature is limited.

When a degree of crystallization of a polymer constituting an electrolyte is reduced, a battery using the polymer electrolyte may be operable at low temperature. However, the polymer electrolyte may not effectively suppress lithium dendrite, leading to a short circuit between positive and negative electrodes and thus reduced life of the lithium metal battery.

The polyethylene-polystyrene copolymer electrolyte may effectively suppress lithium dendrite but have a low ion conductivity. Accordingly, improvements are required in this respect.

To address these drawbacks, the present inventors provide an electrolyte for a lithium metal battery, wherein the electrolyte may be charged and discharged at low temperatures and have improved ion conductivity.

Figure 1:
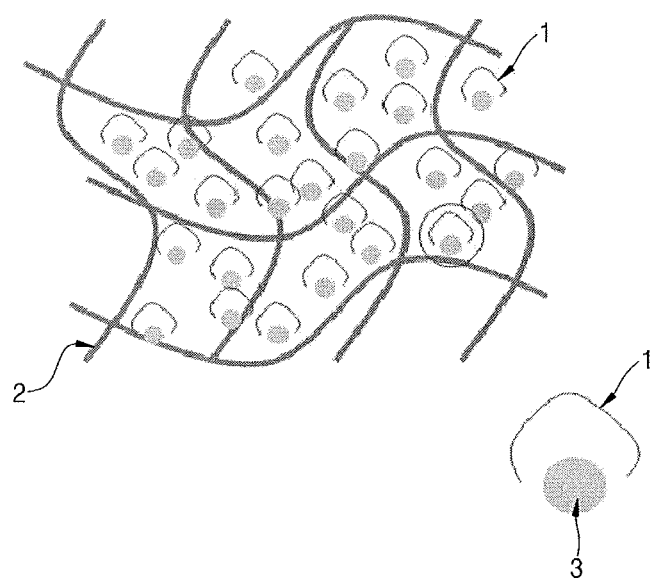
FIG. 1 is a schematic view illustrating a structure of an electrolyte according to an embodiment.

An electrolyte for a lithium metal battery according to an embodiment may include a composite as illustrated in FIG. 1.

Referring to FIG. 1, in the electrolyte according to an embodiment, a polymerization product 2 of a crosslinkable polymer may form a net-like matrix in which glycol ether 1 as a non-carbonate substance having a high ion conductivity and resistance to reduction of lithium metal, and a lithium salt 3 may be present. As illustrated in FIG. 1, the electrolyte according to an embodiment may have a structure including glycol ether 1 and the lithium salt 2 in a net-like matrix. The electrolyte having such a structure may have improved mechanical strength due to the net-like matrix and improved ion conductivity due to the inclusion of the lithium salt 3 and the glycol ether 1.

For example, the glycol ether may be at least one selected from the group consisting of triethylene glycol dimethyl ether, tetraethylene glycol dimethyl ether, ethylene glycol monomethyl ether (MG), diethylene glycol monomethyl ether (MDG), triethylene glycol monomethyl ether (MTG), polyethylene glycol monomethyl ether (MPG), ethylene glycol monoethyl ether (EG), diethylene glycol monoethyl ether (EDG), ethylene glycol monobutyl ether (BG), diethylene glycol monobutyl ether (BDG), triethylene glycol monobutyl ether (BTG), propylene glycol monomethyl ether (MFG), and dipropylene glycol monomethyl ether (MFDG). For example, the glycol ether may be triethylene glycol dimethyl ether or tetraethylene glycol dimethyl ether.

The crosslinkable polymer may be any polymer having a crosslinkable functional group. The crosslinkable functional group may refer to, for example, acrylate, methacrylate, or the like. The crosslinkable polymer having crosslinkable functional groups may form a polymerization product of the crosslinkable polymer through polymerization (crosslinking) reaction between the crosslinkable functional groups when irradiated by heat or light radiation.

The crosslinkable polymer may be, for example, polyoxyethylene glycol diacrylate, polyoxyethylene glycol dimethacrylate, or the like. For example, the crosslinkable polymer may be at least one selected from the group consisting of polyoxyethylene glycol diacrylate and polyoxyethylene glycol dimethacrylate.

In the electrolyte according to one or more embodiments, an amount of the glycol ether may be about 10 parts to about 80 parts by weight, for example, about 10 parts to about 50 parts by weight, each with respect to 100 parts by weight of the crosslinkable polymer. When the amount of the glycol ether is within these ranges, the electrolyte may have improved ion conductivity without reduction in mechanical strength.

In one or more embodiments, the electrolyte may further include ion-conductive inorganic particles.

The ion-conductive inorganic particles may include at least one selected from $Li_{1+x+y}Al_xTi_{2-x}Si_yP_{3-y}O_{12}$ (wherein $0<x<2$ and $0\leq y<3$), $BaTiO_3$, $Pb(Zr,Ti)O_3$ (PZT), $Pb_{1-x}La_xZr_{1-y}Ti_yO_3$ (PLZT) (wherein $0_{x<}1$ and $0\leq y<1$), $Pb(Mg_3Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, lithium phosphate ($Li_3PO_4$), lithium titanium phosphate ($Li_xTi_y(PO_4)_3$, wherein $0<x<2$ and $0<y<3$), lithium aluminum titanium phosphate ($Li_xAl_yTi_z(PO_4)_3$, wherein $0<x<2$, $0<y<1$ and $0<z<3$), $Li_{1+x+y}(Al, Ga)_x(Ti, Ge)_{2-x}Si_yP_{3-y}O_{12}$ (wherein $0\leq x\leq 1$ and $0\leq y\leq 1$), lithium lanthanum titanate ($Li_xLa_yTiO_3$, wherein $0<x<2$ and $0<y<3$), lithium germanium thiophosphate ($Li_xGe_yP_zS_w$, wherein $0<x<4$, $0<y<1$, $0<z<1$, and $0<w<5$), a lithium nitride glass ($Li_xN_y$, wherein $0<x<4$ and $0<y<2$), $SiS_2$ ($Li_xSi_yS_z$, wherein $0<x<3,0<y<2$, and $0<z<4$), a $P_2S_5$ glass ($Li_xP_yS_z$, wherein $0<x<3$, $0<y<3$, and $0<z<7$), $Li_2O$, $LiF$, $LiOH$, $Li_2CO_3$, $LiAlO_2$, a $Li_2O$—$Al_2O_3$—$SiO_2$—$P_2O_5$—$TiO_2$—$GeO_2$ ceramic, a garnet ceramic ($Li_{3+x}La_3M_2O_{12}$, wherein M may be Te, Nb, or Zr, and x may be an integer from 1 to 10), or a combination thereof.

In one or more embodiments, an amount of the ion-conductive inorganic particles may be about 10 parts to about 100 parts by weight, for example, about 20 parts to about 80 parts by weight, each with respect to 100 parts by weight of the crosslinkable polymer. When the amount of the ion-conductive inorganic particles is within these ranges, the electrolyte may have improved mechanical strength.

The ion-conductive inorganic particles may have an average particle diameter of about 1 μm to about 300 μm, for example, about 1 μm to about 200 μm, and for example, about 1 μm to about 150 μm. When the ion-conductive inorganic particles have an average particle diameter within these ranges, it may be easy to prepare the electrolyte including ion-conductive inorganic particles in a single-particle state without a grain boundary through, for example, polishing or the like.

The lithium salt in the electrolyte may be any lithium salt commonly used in preparation of an electrolyte in the art. The lithium salt may be, for example, $LiSCN$, $LiN(CN)_2$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiSbF_6$, $LiN(SO_2CF_3)_2$, $Li(FSO_2)_2N$, $LiC_4F_9SO_3$, $LiN(SO_2CF_2CF_3)_2$, $LiSbF_6$, $LiPF_3(CF_2CF_3)_3$, $LiPF_3(C_2F_5)_3$, $LiPF_3(CF_3)_3$, $LiCl$, $LiF$, $LiBr$, $LiI$, $LiB(C_2O_4)_2$, lithium difluoro(oxalato)borate (LiFOB), lithium bis(oxalato)borate (LiBOB), or a mixture thereof. An amount of the lithium salt may be about 5 mole % to about 80 mole % based on a total amount of the electrolyte.

In one or more embodiments, the electrolyte may have a porosity of about 10% or less, or may have no pore. When the electrolyte has these characteristics, the electrolyte may have improved characteristics of suppressing a short circuit caused due to lithium dendrite.

In one or more embodiments, the electrolyte may include, for example, triethylene glycol dimethyl ether, a polymerization product of polyoxyalkylene glycol acrylate, and a lithium salt.

In one or more embodiments, the electrolyte may include, for example, triethylene glycol dimethyl ether, a polymerization product of polyoxyalkylene glycol acrylate, a lithium salt, and at least one selected from alumina, titania, and silica.

Hereinafter, embodiments of a method of preparing the electrolyte according to any of the above-described embodiments will be described.

An electrolyte composition may be prepared by mixing glycol ether, as a non-carbonate material and lithium ion-conductive compound having resistance to reduction of lithium metal, a crosslinkable polymer, and a lithium salt. In the preparation of the electrolyte composition, the glycol ether, the crosslinkable polymer and the lithium salt may be mixed at the same time. In some other embodiments, after the glycol ether and the lithium salt is mixed together to obtain a first mixture, the crosslinkable polymer may be added to the first mixture to thereby prepare the electrolyte composition.

A polymerization initiator and ion-conductive inorganic particles may be added into the electrolyte composition.

The polymerization initiator may be, for example, a photopolymerization initiator or a thermopolymerization initiator.

The photopolymerization initiator may be any compound able to form a radical by irradiation of light such as ultraviolet (UV) rays. For example, the photopolymerization initiator may be at least one selected from the group consisting of 2-hydroxy-2-methyl-1-phenyl-propane-1-one (HMPP), benzoin ether, dialkyl acetophenone, hydroxyl alkylketone, phenyl glyoxylate, benzyl dimethyl ketal, acyl phosphine, and α-aminoketone. For example, the acyl phosphine may be commercially available lucirin TPO, i.e., 2,4,6-trimethyl-benzoyl-trimethyl phosphine oxide.

The thermopolymerization initiator may be at least one selected from a persulfate-based initiator, an azo-based initiator, and an initiator including hydrogen peroxide and ascorbic acid. Non-limiting examples of the persulfate-based initiator may include sodium persulfate ($Na_2S_2O_8$), potassium persulfate ($K_2S_2O_8$), ammonium persulfate (($NH_4)_2S_2O_8$). Non-limiting examples of the azo-based initiator are 2,2-azobis(2-amidinopropane)dihydrochloride, 2,2-azobis-(N,N-dimethylene) isobutyramidine dihydrochloride, 2-(carbamoylazo)isobutylonitril), 2,2-azobis[2-(2-imidazolin-2-yl)propane] dihydrochloride, 4,4-azobis-(4-cyanovaleric acid), and the like.

An amount of the polymerization initiator may be about 0.005 parts to about 10.0 parts by weight with respect to 100 parts by weight of the crosslinkable polymer. When the amount of the polymerization initiator is within this range, the crosslinkable polymer may have excellent reactivity in polymerization reaction.

The light may be ultraviolet (UV) rays. When the polymerization reaction is performed by light radiation, a lithium metal thin film on which the electrolyte is to be disposed may be prevented from thermal deformation. The time for which the light or heat is applied to induce polymerization (crosslinking) reaction may be varied, for example, may be about 1 minute to about 30 minutes.

When heat is applied, the thermal treatment conditions may vary depending on a type of the crosslinkable polymer or the like. For example, the thermal treatment may be performed at about 60° C. to about 200° C., and in some embodiments, about 60° C. to about 100° C.

In one or more embodiments, the electrolyte may be in a solid state. An all-solid-state battery may be manufactured using the solid state electrolyte.

In one or more embodiments, the electrolyte may further include at least one selected from ethylene carbonate, propylene carbonate, dimethyl carbonate, diethyl carbonate, butylene carbonate, ethylmethyl carbonate, fluoroethylene carbonate, methylpropyl carbonate, ethylpropyl carbonate, methylisopropyl carbonate, dipropyl carbonate, dibutyl carbonate, dimethylene glycol dimethyl ether, trimethylene glycol dimethyl ether, tetraethylene glycol dimethyl ether, polyethylene glycol dimethyl ether, succinonitrile, dimethyl sulfone, ethylmethyl sulfone, diethyl sulfone, adiponitrile, 1,1,2,2-tetrafluoroethyl 2,2,3,3-tetrafluoropropyl ether, 2,2, 3,3,4,4,5,5-octafluoropentyl 1,1,2,2-tetrafluoroethyl ether, benzonitrile, acetonitrile, tetrahydrofuran, 2-methyltetrahydrofuran, γ-butyrolactone, dioxolane, 4-methyl dioxolane, N,N-dimethylformamide, N,N-dimethylacetamide, dimethyl sulfoxide, dioxane, sulfolane, dichloroethane, chlorobenzene, and nitrobenzene.

To improve charge-discharge characteristics and resistance to flame, the electrolyte may further include pyridine, triethylphosphate, triethanolamine, cyclic ether, ethylene diamine, n-glyme, hexamethyl phosphoramide, nitrobenzene derivative, sulfur, a quinone imine dye, N-substituted oxazolidinone, N,N-substituted imidazolidine, ethylene glycol dialkyl ether, an ammonium salt, pyrrole, 2-methoxyethanol, or aluminum trichloride may be added to the electrolyte. In some embodiments, to provide nonflammable characteristics, a halogen-containing solvent such as carbon tetrachloride, ethylene trifluoride, or the like may be further added to the electrolyte, if needed.

Figure 2:
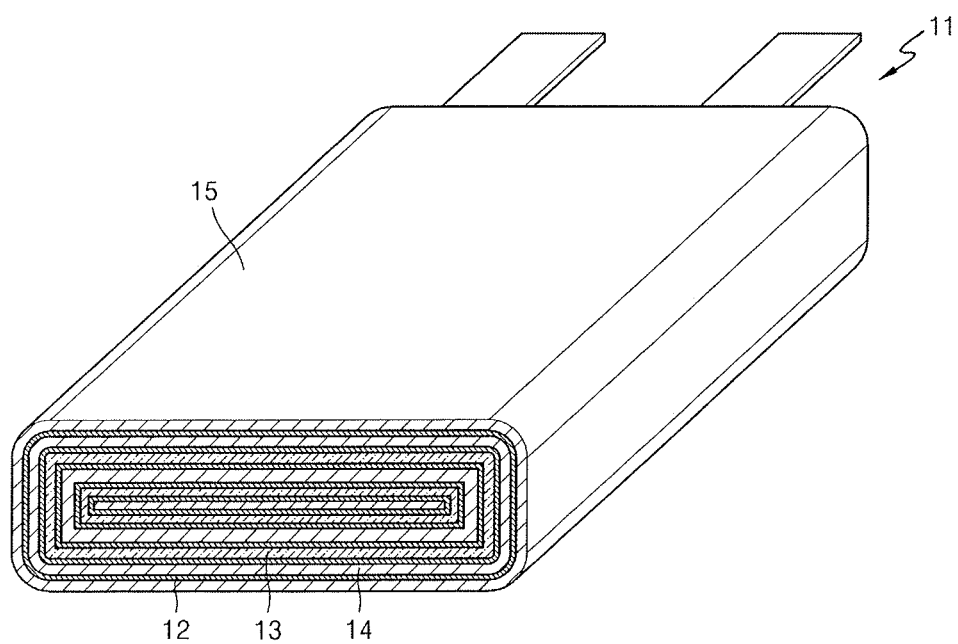
FIG. 2 is a view illustrating a structure of a lithium metal battery according to an embodiment.

FIG. 2 is a view illustrating a structure of a lithium metal battery 11 according to an embodiment.

Referring to FIG. 2, the lithium metal battery 11 may include a positive electrode 13, a lithium negative electrode 12, and a separator 14. The positive electrode 13, the lithium negative electrode 12, and the separator 14 as described above may be wound, stacked, or folded, and then accommodated in a battery case 15. Subsequently, an electrolyte according to any of the above-described embodiments may be injected into the battery case 15, followed by sealing the battery case 15 with a cap assembly (not shown), thereby completing the manufacture of the lithium metal battery 11. The battery case 15 may have a cylindrical, rectangular, pouch, or thin film shape. For example, the lithium metal battery 11 may be a large-sized thin film-type battery, for example, a lithium ion battery.

For example, the lithium metal battery may be manufactured in the following manner.

First, the positive electrode may be prepared as follows.

For example, a positive active material, a conducting agent, a binder, and a solvent may be mixed to prepare a positive active material composition. The positive active material composition may be directly coated on a metallic current collector to form a positive electrode. In some embodiments, the positive active material composition may be cast on a separate support to form a positive active material film. This positive active material film may then be separated from the support and laminated on a metallic current collector to thereby form a positive electrode. The positive electrode is not limited to the above-described forms, and may be any of a variety of types.

The positive active material may be any material available in the art, for example, a lithium-containing metal oxide. In some embodiments, the positive active material may be at least one of a composite oxide of lithium with a metal selected from Co, Mn, Ni, and a combination thereof. In some embodiments, the positive active material may be a compound represented by one of the following formulae:

$Li_aA_{1-b}B^1{}_bD^1{}_2$ (wherein 0.90≤a≤1.8, and 0≤b≤0.5); $Li_aE_{1-b}B^1{}_bO_{2-c}D^1{}_c$ (wherein 0.90≤a≤1.8, 0≤b≤0.5, and 0≤c≤0.05); $LiE_{2-b}B^1{}_bO_{4-c}D^1{}_c$ (wherein 0≤b≤0.5, and 0≤c≤0.05); $Li_aNi_{1-b-c}Co_bB^1{}_cD^1{}_\alpha$ (wherein 0.90≤a≤1.8, 0≤b≤0.5, 0≤c≤0.05, and 0<α≤2); $Li_aNi_{1-b-c}Co_bB^1{}_cO_{2-\alpha}F^1{}_\alpha$ (wherein 0.90≤a≤1.8, 0≤b≤0.5, 0≤c≤0.05, and 0<α<2); $Li_aNi_{1-b-c}Co_bB^1{}_cO_{2-\alpha}F^1{}_2$ (wherein 0.90≤a≤1.8, 0≤b≤0.5, 0≤c≤0.05, and 0<α<2); $Li_aNi_{1-b-c}Mn_bB^1{}_cD^1{}_\alpha$ (wherein 0.90≤a≤1.8, 0≤b≤0.5, 0≤c≤0.05, and 0<α≤2); $Li_aNi_{1-b-c}Mn_bB^1{}_cO_{2-\alpha}F^1{}_\alpha$ (wherein 0.90≤a≤1.8, 0≤b≤0.5, 0≤c≤0.05, and 0<α<2); $Li_aNi_{1-b-c}Mn_bB^1{}_cO_{2-\alpha}F^1{}_2$ (wherein 0.90≤a≤1.8, 0≤b≤0.5, 0≤c≤0.05, and 0<α<2); $Li_aNi_bE_cG_dO_2$ (wherein 0.90≤a≤1.8, 0≤b≤0.9, 0≤c≤0.5, and 0.001≤d≤0.1); $Li_aNi_bCo_cMn_dGeO_2$ (wherein 0.90≤a≤1.8, 0≤b≤0.9, 0≤c≤0.5, 0≤d≤0.5, and 0.001≤e≤0.1); $Li_aNiG_bO_2$ (wherein 0.90≤a≤1.8, and 0.001≤b≤0.1); $Li_aCoG_bO_2$ (wherein 0.90≤a≤1.8, and 0.001≤b≤0.1); $Li_aMnG_bO_2$ (wherein 0.90≤a≤1.8, and 0.001≤b≤0.1); $Li_aMn_2G_bO_4$ (wherein 0.90≤a≤1.8, and 0.001≤b≤0.1); $QO_2$; $QS_2$; $LiQS_2$; $V_2O_5$; $LiV_2O_5$; $LiI^1O_2$; $LiNiVO_4$; $Li_{(3-f)}J_2(PO_4)_3$ (wherein 0≤f≤2); $Li_{(3-f)}Fe_2(PO_4)_3$ (wherein 0≤f≤2); and $LiFePO_4$.

In the foregoing formulae above, A may be nickel (Ni), cobalt (Co), manganese (Mn), or a combination thereof; B may be aluminum (Al), nickel (Ni), cobalt (Co), manganese (Mn), chromium (Cr), iron (Fe), magnesium (Mg), strontium (Sr), vanadium (V), a rare earth element, or a combination thereof; D may be oxygen (O), fluorine (F), sulfur (S), phosphorus (P), or a combination thereof; E may be cobalt (Co), manganese (Mn), or a combination thereof; F may be fluorine (F), sulfur (S), phosphorus (P), or a combination thereof; G may be aluminum (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof.

For example, the positive active material may be $LiCoO_2$, $LiMn_xO_{2x}$ (wherein x=1 or 2), $LiNi_{1-x}Mn_xO_{2x}$ (wherein 0<x<1), $LiNi_{1-x-y}Co_xMn_yO_2$ (wherein 0≤x≤0.5 and 0≤y≤0.5), or $LiFePO_4$.

The compounds listed above as positive active materials may have a surface coating layer (hereinafter, also referred to as "coating layer"). Alternatively, a mixture of a compound without a coating layer and a compound having a coating layer, the compounds being selected from the above-listed compounds, may be used. In some embodiments, the coating layer may include at least one compound of a coating element selected from the group consisting of oxide, hydroxide, oxyhydroxide, oxycarbonate, and hydroxycarbonate of the coating element. In some embodiments, the compounds for the coating layer may be amorphous or crystalline. In some embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. In some embodiments, the coating layer may be formed using any method that does not adversely affect the physical properties of the positive active material when a compound of the coating element is used. For example, the coating layer may be formed using a spray coating method or a dipping method. The coating methods may be well understood by one of ordinary skill in the art, and thus a detailed description thereof will be omitted.

In some embodiments, the conducting agent may be carbon black or graphite particulates, but embodiments are not limited thereto. Any material available as a conducting agent in the art may be used.

Examples of the binder may be a vinylidene fluoride/hexafluoropropylene copolymer, polyvinylidene fluoride (PVDF), polyacrylonitrile, polymethylmethacrylate, polytetrafluoroethylene, mixtures thereof, and a styrene butadiene rubber polymer. However, embodiments are not limited thereto. Any material available as a binding agent in the art may be used.

Examples of the solvent may be N-methyl-pyrrolidone, acetone, and water. However, embodiments are not limited thereto. Any material available as a solvent in the art may be used.

The amounts of the positive active material, the conducting agent, the binder, and the solvent may be in ranges that are commonly used in lithium batteries. At least one of the conducting agent, the binder, and the solvent may be omitted according to the use and the structure of the lithium battery.

Next, the lithium metal negative electrode may be prepared as follows.

The lithium metal negative electrode may be a lithium metal or lithium metal ally in the form of a thin film.

The lithium metal or lithium metal alloy used as the lithium metal negative electrode may have a thickness of about 100 μm or less, for example, about 80 μm or less, for example, about 0.1 μm to about 60 μm. In some other embodiments, the lithium metal or lithium metal alloy may have a thickness of about 1 μm to about 25 μm, for example, about 5 μm to about 20 μm.

The lithium metal alloy may include a lithium metal, and a metal/metalloid alloyable with lithium metal, or an oxide thereof. Examples of the metal/metalloid allowable with lithium metal or the oxide thereof may be Si, Sn, Al, Ge, Pb, Bi, Sb, a Si—Y alloy (wherein Y may be an alkali metal, an alkali earth metal, a Group 13 element, a Group 14 element, a transition metal, a rare earth element, or a combination thereof, but not Si), a Sn—Y alloy (wherein Y may be an alkali metal, an alkali earth metal, a Group 13 element, a Group 14 element, a transition metal, a rare earth element, or a combination thereof, but not Sn), and $MnO_x$ (wherein 0<x≤2). For example, the element Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), chromium (Cr), molybdenum (Mo), tungsten (W), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or a combination thereof. Examples of the oxide of the metal/metalloid allowable with lithium metal may be lithium titanium oxide, vanadium oxide, lithium vanadium oxide, $SnO_2$, and $SiO_x$ (wherein 0<x<2).

Next, the electrolyte to be interposed between the positive electrode and the lithium metal negative electrode may be prepared.

In one or more embodiments, a common electrolyte available for lithium metal batteries may further be used, in addition to the electrolyte according to any of the above-described embodiments.

In one or more embodiments, the lithium metal battery may further include a liquid electrolyte.

The liquid electrolyte may include at least one selected from an organic solvent, an ionic liquid, and a lithium salt. The organic solvent may be a carbonate compound, a glyme compound, a dioxolane compound, dimethyl ether, 1,1,2,2-tetrafluoroethyl 2,2,3,3-tetrafluoropropyl ether, or the like. The organic solvent may be at least one selected from ethylene carbonate, propylene carbonate, dimethyl carbonate, diethyl carbonate, ethylmethyl carbonate, fluoroethylene carbonate, γ-butyrolactone, dimethoxyethane, diethoxyethane, dimethylene glycol dimethyl ether, trimethylene glycol dimethyl ether, tetraethylene glycol dimethyl ether, polyethylene glycol dimethyl ether, succinonitrile, sulfolane, dimethyl sulfone, ethyl methyl sulfone, diethyl sulfone, adiponitrile, and 1,1,2,2-tetrafluoroethyl 2,2,3,3-tetrafluoropropyl ether.

In one or more embodiments, when the electrolyte is used together with a liquid electrolyte including an organic solvent such as a carbonate compound, the electrolyte according to any of the embodiments may be highly stable to the organic solvent such as a carbonate compound or to the electrolyte including the organic solvent, and thus have improved resistance to chemicals.

In one or more embodiments, the lithium metal battery may further include a separator. For example, the separator may be a monolayer of polyethylene, polypropylene, polyvinylidene fluoride, or a combination thereof, or a multilayer including at least two layers of polyethylene, polypropylene, polyvinylidene fluoride, or a combination thereof. For example, the separator may be a mixed multilayer structure, for example, a two-layer separator of polyethylene/polypropylene, a three-layer separator of polyethylene/polypropylene/polyethylene, or a three-layer separator of polypropylene/polyethylene/polypropylene. The separator may further include an electrolyte including a lithium salt and an organic solvent.

The positive electrode may be a porous positive electrode. The porous positive electrode may be a positive electrode including pores or a positive electrode which is prepared without the intentional exclusion of pores to allow permeation of the liquid electrolyte into the positive electrode due to capillary action or the like.

For example, the porous positive electrode may be a positive electrode obtained by coating a positive active material composition including a positive active material, a conducting agent, a binder and a solvent, and drying the resulting structure. The thus obtained positive electrode may include pores among particles of the positive active material. The porous positive electrode may be impregnated with liquid electrolyte.

In one or more embodiments, the positive electrode may include a liquid electrolyte, a gel electrolyte, or a solid electrolyte. The liquid electrolyte, the gel electrolyte, and the solid electrolyte may be any suitable electrolyte for lithium metal batteries that does not react with the positive active material and thus prevents deterioration of the positive active material during charging and discharging.

In one or more embodiments, the lithium metal negative electrode may be a metal thin film or a lithium metal alloy thin film. The lithium metal thin film or the lithium metal alloy thin film may have a thickness of about 100 μm or less. For example, the lithium metal battery may have stable cycle characteristics even with a lithium metal thin film or a lithium metal alloy thin film each having a thickness of 100 μm or less. In the lithium metal battery according to one or more embodiments, the lithium metal thin film or the lithium metal alloy thin film may have a thickness of about 80 μm or less, for example, about 60 μm or less, and for example, about 0.1 μm to about 60 μm. However, in a lithium battery according to the related art, when a lithium metal thin film or a lithium metal alloy thin film has a small thickness of about 100 μm or less, it was not possible to manufacture the lithium battery having stable cycle characteristics due to an increased thickness of lithium deteriorated due to a side reaction, dendrite formation, or the like. However, a lithium metal battery having stable cycle characteristics may be manufactured using the electrolyte according to any of the embodiments.

The lithium metal battery according to one or more embodiments may be used in any device that requires high capacity and high output, for example, in a laptop computer, a smart phone, or an electric vehicle.

The lithium metal battery according to one or more embodiments may have improved lifetime characteristics and high rate characteristics, and thus may be used in an electric vehicle (EV), for example, in a hybrid vehicle such as a plug-in hybrid electric vehicle (PHEV). The lithium metal battery may also be used in the high-power storage field. For example, the lithium metal battery may be used in an electric bicycle or a power tool.

In one or more embodiments, the electrolyte according to any of the embodiments may further include at least one selected from an ionic liquid and a polymeric ionic liquid.

The ionic liquid may refer to a salt in a liquid state at room temperature or a fused salt at room temperature, each having a melting point equal to or below the room temperature and consisting of only ions. The ionic liquid may include: i) at least one cation selected from an ammonium cation, a pyrrolidinium cation, a pyridinium cation, a pyrimidinium cation, an imidazolium cation, a piperidinum cation, a pyrazolium cation, an oxazolium cation, a pyridazinium cation, a phosphonium cation, a sulfonium cation, a triazolium cation, and a combination thereof; and ii) at least one anion selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $SO_4^-$, $CF_3SO_3^-$, $(FSO_2)_2N^-$, $(C_2F_5SO_2)_2N^-$, $(C_2F_5SO_2)(CF_3SO_2)N^-$, and $(CF_3SO_2)_2N^-$.

The ionic liquid may be, for example, at least one selected from the group consisting of N-methyl-N-propylpyrrolidium bis(trifluoromethylsulfonyl)imide, N-butyl-N-methylpyrrolidium bis(3-trifluoromethylsulfonyl)imide, 1-butyl-3-methylimidazolium bis(trifluoromethylsulfonyl)imide, and 1-ethyl-3-methylimidazolium bis(trifluoromethylsulfonyl)imide.

In one or more embodiments, an amount of the ionic liquid may be about 5 parts to about 40 parts by weight, for example, about 10 parts to about 20 parts by weight, with respect to 100 parts by weight of the ion-conductive polymer. When the amount of the ionic liquid is within these ranges, the electrolyte may have improved ion conductivity and mechanical properties.

In one or more embodiments, when the electrolyte includes an ionic liquid and a lithium salt, a molar ratio (IL/Li) of the ionic liquid (IL) to lithium ions (Li) may be about 0.1 to about 2.0, for example, about 0.2 to about 1.8, and for example, about 0.4 to about 1.5. The electrolyte according to one or more embodiments having a molar ratio within these ranges may have improved lithium ion mobility and ion conductivity, and improved physical properties, and thus may effectively suppress the growth of lithium dendrite on a surface of the negative electrode.

In one or more embodiments, the polymeric ionic liquid may include a cation selected from a poly(1-vinyl-3-alkylimidazolium) cation, a poly(1-allyl-3-alkylimidazolium) cation, and a poly(1-(methacryloyloxy-3-alkylimidazolium) cation, and an anion selected from $CH_3COO^-$, $CF_3COO^-$, $CH_3SO_3^-$, $CF_3SO_3^-$, $(CF_3SO_2)_2N^-$, $(FSO_2)_2N^-$, $(CF_3SO_2)_3C^-$, $(CF_3CF_2SO_2)_2N^-$, $C_4F_9SO_3^-$, $C_3F_7COO^-$, and $(CF_3SO_2)(CF_3CO)N^-$.

In one or more embodiments, the polymeric ionic liquid may include a low-molecular weight polymer, a thermally stable ionic liquid, and a lithium salt. The low-molecular weight polymer may have an ethylene oxide chain. The low-molecular weight polymer may be a glyme. Examples of the glyme may include polyethyleneglycol dimethylether (polyglyme), tetraethyleneglycol dimethyl ether (tetraglyme), and triethyleneglycol dimethylether (triglyme).

In one or more embodiments, the electrolyte may have an ion conductivity of about $1\times10^{-4}$ S/cm or greater at about 25° C., for example, about $5\times10^{-4}$ S/cm or greater at about 25° C., and for example, about $1\times10^{-3}$ S/cm or greater at about 25° C. In one or more embodiments, the electrolyte may have a tensile strength of, for example, about 200 kgf/cm$^2$ to about 650 kgf/cm$^2$.

In one or more embodiments, the lithium metal battery may be, for example, a lithium air battery, a lithium ion battery, a lithium polymer battery, or a lithium sulfur battery.

The lithium metal battery according to one or more embodiments may have excellent cell performance at a high voltage. The term "high voltage" may refer to a charging voltage in a range of about 4.0 V to about 5.5 V.

One or more embodiments of the present disclosure will now be described in detail with reference to the following examples. However, these examples are only for illustrative purposes and are not intended to limit the scope of the one or more embodiments of the present disclosure.

EXAMPLE 1

17.6% by weight (wt %) of polyoxyethylene glycol acrylate was mixed with benzyl dimethyl ketal as a polymerization initiator, 58.8 wt % of triethylene glycol dimethyl ether, and 23.5 wt % of lithium bis(fluorosulfonyl)imide (LiFSI) as a lithium salt were mixed together to prepare an electrolyte composition.

The electrolyte composition was coated on a support substrate with a doctor blade to a thickness of about 100 μm, and then subjected to UV irradiation for about 30 seconds to perform polymerization to thereby prepare an electrolyte including a polymerization product of the polyoxyethylene glycol acrylate, triethylene glycol dimethyl ether and LiFSI.

EXAMPLE 2

17.6 wt % of polyoxyethylene glycol acrylate was mixed with benzyl dimethyl ketal as a polymerization initiator, 58.8 wt % of triethylene glycol dimethyl ether, lithium bis(fluorosulfonyl)imide (LiFSI) as a lithium salt, and $Al_2O_3$ having an average particle diameter of about 500 nm to prepare an electrolyte composition. An amount of LiFSI was about 25% by mole (mole %) based on a total amount of an electrolyte, and an amount of $Al_2O_3$ was about 60 parts by weight with respect to 100 parts by weight of polyoxyethylene glycol acrylate.

The electrolyte composition was coated on a support substrate with a doctor blade to a thickness of about 100 μm, and then subjected to UV irradiation for about 30 seconds to perform polymerization to thereby prepare an electrolyte.

EXAMPLE 3

An electrolyte was prepared in the same manner as in Example 2, except that LTAP ($Li_{1.4}Ti_{1.6}Al_{0.4}P_3O_{12}$) having an average particle diameter of about 2000 nm was used instead of $Al_2O_3$ having an average particle diameter of about 500 nm to prepare the electrolyte composition.

Example 4

An electrolyte was prepared in the same manner as in Example 2, except that $Al_2O_3$ having an average particle diameter of about 500 nm was not added in the preparation of the electrolyte composition.

EXAMPLE 5

An electrolyte was prepared in the same manner as in Example 2, except that the amount of LiFSI was about 100 mole % based on a total amount of the electrolyte.

EXAMPLES 6-8

An electrolyte was prepared in the same manner as in Example 1, except that UV irradiation was performed for about 60 seconds, about 90 seconds, and 120 seconds instead of about 30 seconds, respectively.

EXAMPLE 11

A positive electrode was disposed between two lithium metal negative electrodes, and the electrolyte prepared in Example 6 was interposed between the positive electrode and each of the lithium metal negative electrodes to thereby manufacture a lithium metal battery.

The positive electrode was previously manufactured as follows. LiFePO$_4$, a conducting agent (Super-P; Timcal Ltd.), polyvinylidene fluoride (PVdF), and N-methylpyrrolidone were mixed together to obtain a positive electrode composition. A mixed weight ratio of LiFePO$_4$, the conducting agent and PVdF in the positive electrode composition was about 97:1.5:1.5.

The positive electrode composition was coated on a surface of an aluminum foil (thickness: about 15 μm), dried at about 25° C., and further dried at about 110° C. under vacuum, to thereby manufacture the positive electrode.

COMPARATIVE EXAMPLE 1

76.5 wt % of polyethylene oxide (PEO) was mixed with 23.5 wt % of lithium bis(fluorosulfonyl)imide (LiFSI) as a lithium salt, and chloroform as an organic solvent to prepare an electrolyte composition. An amount of chloroform used as the organic solvent was about 500 parts by weight with respect to 100 parts by weight of the polyethylene oxide.

The electrolyte composition was coated on a support substrate with a doctor blade and then thermally treated at about 60° C. for about 24 hours to thereby prepare an electrolyte including polyethylene oxide (PEO) and LiFSI.

COMPARATIVE EXAMPLE 2

An electrolyte was prepared in the same manner as in Comparative Example 1, except that 76.5 wt % of polyoxyethylene glycol acrylate was mixed with benzyl dimethyl ketal as a polymerization initiator, and 23.5 wt % of lithium bis(fluorosulfonyl)imide (LiFSI) as a lithium salt to prepare the electrolyte composition.

COMPARATIVE EXAMPLE 3

76.5 wt % of polyethylene oxide (PEO) was mixed with lithium bis(fluorosulfonyl)imide (LiFSI) as a lithium salt, chloroform as an organic solvent, and $Al_2O_3$ having an average particle diameter of about 500 nm to prepare an electrolyte composition. An amount of chloroform used as the organic solvent was about 500 parts by weight with respect to 100 parts by weight of the polyethylene oxide (PEO), and an amount of LiFSI was about 5.0 mole % based on a total amount of the electrolyte.

The electrolyte composition was coated on a support substrate with a doctor blade and then thermally treated at about 60° C. for about 24 hours to thereby prepare an electrolyte including polyethylene oxide, LiFSI, and $Al_2O_3$.

COMPARATIVE EXAMPLE 4

An electrolyte was prepared in the same manner as in Comparative Example 3, except that LTAP having an average particle diameter of about 2000 nm was used instead of Al2O3 having an average particle diameter of about 500 nm to prepare the electrolyte composition.

COMPARATIVE EXAMPLE 5

Polyethylene oxide (PEO) was mixed with lithium bis(fluorosulfonyl)imide (LiFSI) as a lithium salt and chloroform as an organic solvent to prepare an electrolyte composition. An amount of chloroform used as the organic solvent was about 500 parts by weight with respect to 100 parts by weight of the polyethylene oxide (PEO), and an amount of LiFSI was about 5.0 mole % based on a total amount of the electrolyte.

The electrolyte composition was coated on a support substrate with a doctor blade and then thermally treated at about 60° C. for about 24 hours to thereby prepare an electrolyte including polyethylene oxide and LiFSI.

COMPARATIVE EXAMPLE 6

An electrolyte was prepared in the same manner as in Example 1, except that UV irradiation was not performed.

COMPARATIVE EXAMPLE 7

A lithium metal battery was manufactured in the same manner as in Example 11, except that the electrolyte of Comparative Example 3 was used instead of the electrolyte of Example 6.

COMPARATIVE EXAMPLE 8

17.6 wt % of polyethylene oxide (PEO) was mixed with 58.8 wt % of triethylene glycol dimethyl ether, 23.5 wt % of lithium bis(fluorosulfonyl)imide (LiFSI) as a lithium salt, and acetonitrile to prepare an electrolyte composition.

The electrolyte composition was coated on a support substrate with a doctor blade and then thermally treated at about 60° C. for about 5 hours to thereby prepare an electrolyte including polyethylene oxide, triethylene glycol dimethyl ether, and LiFSI.

COMPARATIVE EXAMPLE 9

An electrolyte was prepared in the same manner as in Comparative Example 8, except that polyethylene carbonate (PEC) was used instead of polyethylene oxide (PEO).

COMPARATIVE EXAMPLE 10

An electrolyte was prepared in the same manner as in Comparative Example 1, except that polyacrylonitrile (PAN) was used instead of polyethylene oxide (PEO).

COMPARATIVE EXAMPLE 11

An electrolyte was prepared in the same manner as in Comparative Example 8, except that polymethyl methacrylate (PMMA) was used instead of polyethylene oxide (PEO).

EVALUATION EXAMPLE 1

Ion Conductivity

1) Example 1 and Comparative Examples 1, 2,8-11

An ion conductivity of each of the electrolytes prepared in Example 1 and Comparative Examples 1, 2, 8 to 11 was evaluated at different temperatures by measurement of a resistance at a voltage bias of about 10 mV in a frequency range of about 1 Hz to about 1 MHz.

The results of the ion conductivity evaluation at 25° C., 45° C. and 80° C. are shown in Table 1.

TABLE 1

| Example | Ion conductivity (mS/cm) | | |
|---|---|---|---|
| | 25° C. | 45° C. | 80° C. |
| Example 1 | $1 \times 10^{-3}$ | $2 \times 10^{-3}$ | $4 \times 10^{-3}$ |
| Comparative Example 1 | $2 \times 10^{-5}$ | $9 \times 10^{-5}$ | $2 \times 10^{-4}$ |
| Comparative Example 2 | $5 \times 10^{-6}$ | $6 \times 10^{-5}$ | $1 \times 10^{-4}$ |
| Comparative Example 8 | $1 \times 10^{-4}$ | $3 \times 10^{-4}$ | $7 \times 10^{-4}$ |
| Comparative Example 9 | $1 \times 10^{-4}$ | $3 \times 10^{-4}$ | $6 \times 10^{-4}$ |
| Comparative Example 10 | $3 \times 10^{-5}$ | $1 \times 10^{-4}$ | $3 \times 10^{-4}$ |
| Comparative Example 11 | $5 \times 10^{-5}$ | $2 \times 10^{-4}$ | $5 \times 10^{-4}$ |

Referring to Table 1, the electrolyte of Example 1 was found to have an improved ion conductivity, as compared with the electrolytes of Comparative Examples 1, 2, 8 to 11.

2) Examples 2-5 and Comparative Examples 3-5

An ion conductivity of each of the electrolytes prepared in Examples 2 to 5 and Comparative Examples 3 to 5 was evaluated at different temperatures by measurement of a resistance at a voltage bias of about 10 mV in a frequency range of about 1 Hz to about 1 MHz. The results of the ion conductivity evaluation at 25° C., 45° C. and 80° C. are shown in Table 2.

TABLE 2

| Example | Ion conductivity (mS/cm) | | | |
|---|---|---|---|---|
| | 25° C. | 45° C. | 65° C. | 80° C. |
| Example 2 | $6.2 \times 10^{-4}$ | $7.2 \times 10^{-4}$ | $8.1 \times 10^{-4}$ | $9.4 \times 10^{-4}$ |
| Example 3 | $7.6 \times 10^{-4}$ | $8.4 \times 10^{-4}$ | $9.6 \times 10^{-4}$ | $1.1 \times 10^{-3}$ |
| Example 4 | $1.8 \times 10^{-3}$ | $2.5 \times 10^{-3}$ | $3.2 \times 10^{-3}$ | $3.8 \times 10^{-3}$ |
| Example 5 | $4.8 \times 10^{-4}$ | $6.8 \times 10^{-4}$ | $7.4 \times 10^{-4}$ | $8.2 \times 10^{-4}$ |
| Comparative Example 3 | $7.5 \times 10^{-6}$ | $1.9 \times 10^{-5}$ | $6.7 \times 10^{-5}$ | $8.8 \times 10^{-5}$ |
| Comparative Example 4 | $5.7 \times 10^{-5}$ | $7.6 \times 10^{-5}$ | $9.2 \times 10^{-5}$ | $1.1 \times 10^{-4}$ |
| Comparative Example 5 | $1.6 \times 10^{-5}$ | $3.7 \times 10^{-5}$ | $7.5 \times 10^{5}$ | $9.7 \times 10^{-5}$ |

Referring to Table 2, the electrolytes of Examples 2 to 5 were found to have improved ion conductivities, as compared with the electrolytes of Comparative Examples 3 to 5.

EVALUATION EXAMPLE 2

Short-Circuit Current ($C_d$*)

Each of the electrolytes prepared in Examples 1 to 5 and Comparative Examples 1 and 2 was interposed between two lithium metals to thereby manufacture lithium symmetric cells.

The amount of current in each of the lithium symmetric cells until a short-circuit occurred was evaluated. The results are shown in Table 3.

The evaluation conditions were as follows: The lithium symmetric cells were manufactured as coin cells, and the electrolyte in the middle of each of the symmetric cells was charged and discharged at about 0.17 mA/cm² for about 2 hours.

A current amount when a short-circuit occurred and a voltage reached nearly zero (0) was calculated and represented as a short-circuit current ($C_d$) value.

TABLE 3

| Example | Short-circuit current ($C_d$*) (at a measurement temperature) |
|---|---|
| Example 1 | 17.5 (45° C.), 15.9 (80° C.) |
| Comparative Example 1 | 0 (45° C.), 1.8 (80° C.) |
| Comparative Example 2 | 0 (short-circuit occurred) |
| Comparative Example 8 | 0 (short-circuit occurred) |
| Comparative Example 9 | 0 (short-circuit occurred) |
| Comparative Example 10 | 0 (short-circuit occurred) |
| Comparative Example 11 | 0 (short-circuit occurred) |

Referring to Table 3, it was found that the greater the ionic conductivity, the more active the migration of lithium became and the greater the suppression of lithium dendrite growth became. On the contrary, the smaller the ionic conductivity, the larger the resistance became and the migration of lithium was reduced, with facilitated migration of lithium only toward a region with a higher ionic conductivity, leading to dendrite formation and eventually a short-circuit of the cell.

EVALUATION EXAMPLE 3

The electrolytes prepared in Examples 1, 6 to 9 were analyzed by X-ray diffraction analysis with an X'pert PRO (PANalytical) using Cu Kα radiation (1.54056 Å) to evaluate a matrix structure and curing of each of the electrolytes.

Figure 11:
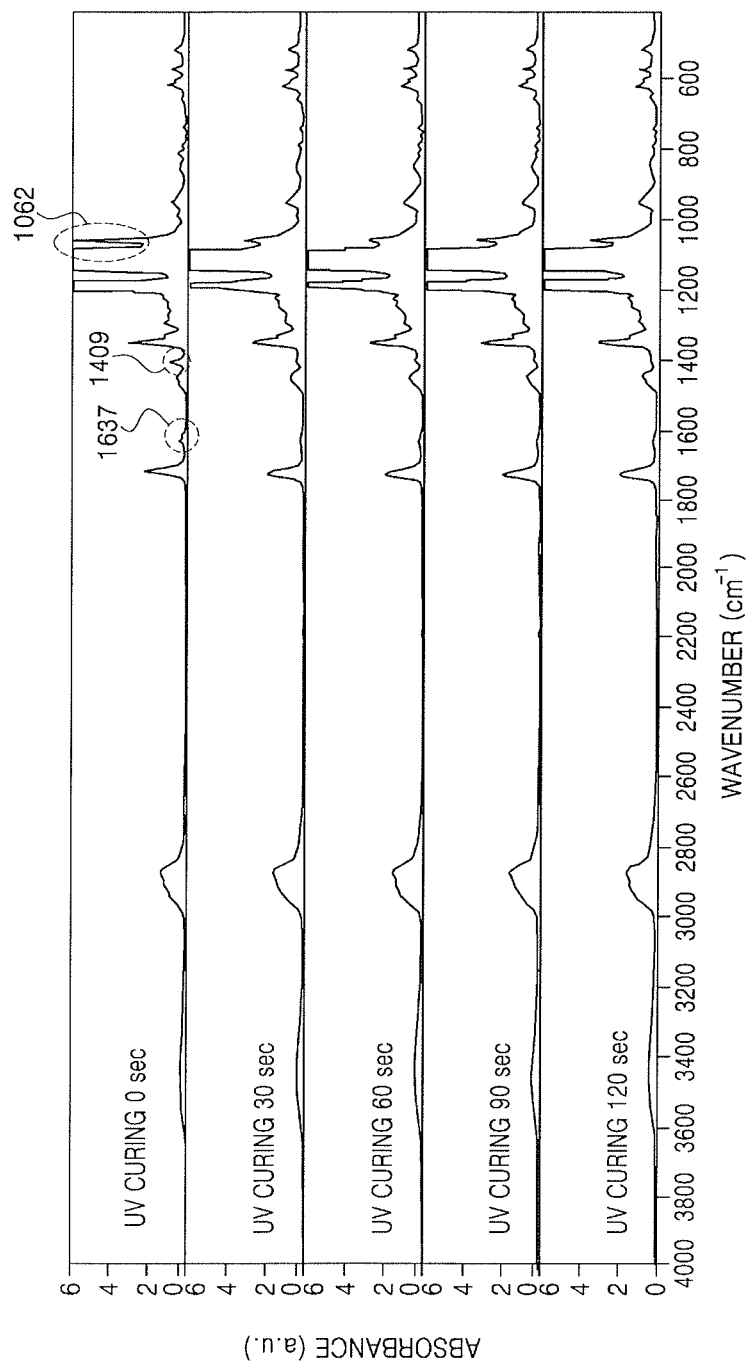
FIG. 11 is a plot illustrating results of curing evaluation of electrolytes of Examples 1,6 to 8 and Comparative Example 6.

The evaluation results are shown in FIG. 11.

Referring to FIG. 11, intensities of peaks of carbon-containing double bonds of the electrolytes (at wavelengths of 1637 nm, 1409 nm, and 1062 nm) reduced as UV curing continued, and thus it was found that double bonds changed into single bonds in the matrix structure.

EVALUATION EXAMPLE 4

Cycle Lifetime

Cycle lifetimes of the lithium metal batteries of Example 11 and Comparative Example 7 were evaluated in the following manner.

Each of the lithium metal batteries was charged at about 45° C. with a constant current of 0.1 Coulomb (C) rate until a voltage of about 4.30 Volts (V) (with respect to Li) was reached, and then with a constant voltage of 4.30 V until a cutoff current of 0.05 C rate was reached, and was then discharged with a constant current of 0.1 C rate until a voltage of about 2.8 V (with respect to Li) was reached (Formation process, 1$^{st}$ cycle). This charging and discharging process was performed further twice to complete the formation process.

Subsequently, each of the lithium metal batteries after the formation process was charged at about 25° C. with a constant current of 0.5 C rate in a voltage range of about 3.0 V to about 4.4 V (with respect to Li), and then discharged with a constant current of 0.2 C (0.72 mA) until a cutoff voltage of 4.4 V was reached.

The above-described charging and discharge process was repeated 99 times.

Figure 12:
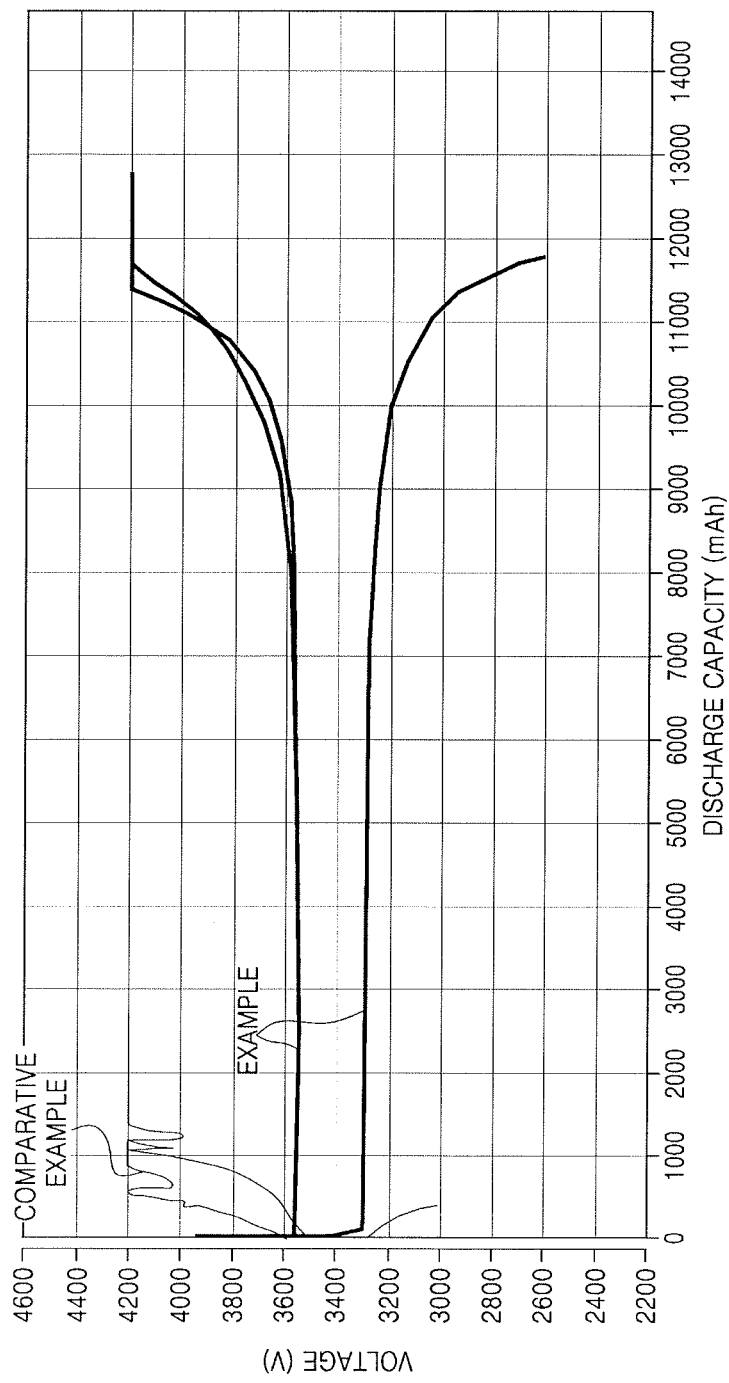
FIG. 12 is a graph illustrating the cycle life of lithium metal battery of Example 11 and Comparative Example 7.

Lifetimes of the lithium metal batteries of Example 11 and Comparative Example 7 at 45° C. are shown in FIG. 12.

Referring to FIG. 12, the lithium metal battery of Example 11 was found to have improved cycle lifetime at 45° C., as compared with the lithium metal battery of Comparative Example 6. This is attributed to that the lithium metal battery of Example 11 had higher ion conductivity and $C_d$ value, as compared with those of the lithium metal battery of Comparative Example 7.

The lithium metal battery of Example 11 was found to have improved cycle lifetime, as compared with the lithium metal battery of Comparative Example 7.

EVALUATION EXAMPLE 5

Energy Dispersive X-Ray Spectroscopy (EDS) Mapping

The electrolytes of Example 1 and Comparative Example 8 were analyzed by energy dispersive X-ray spectroscopy (EDS) to perform mapping of the fluorine (F) component.

Figure 3A:
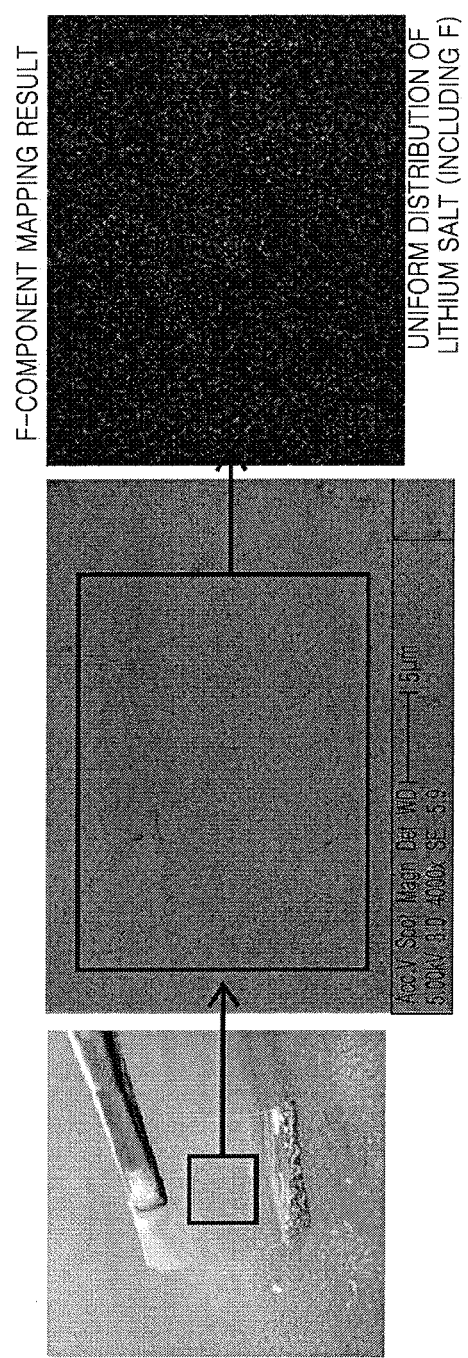
FIGS. 3A and 3B are images illustrating results of mapping analysis of electrolytes prepared in Example 1 and Comparative Example 8, respectively.
Figure 3B:
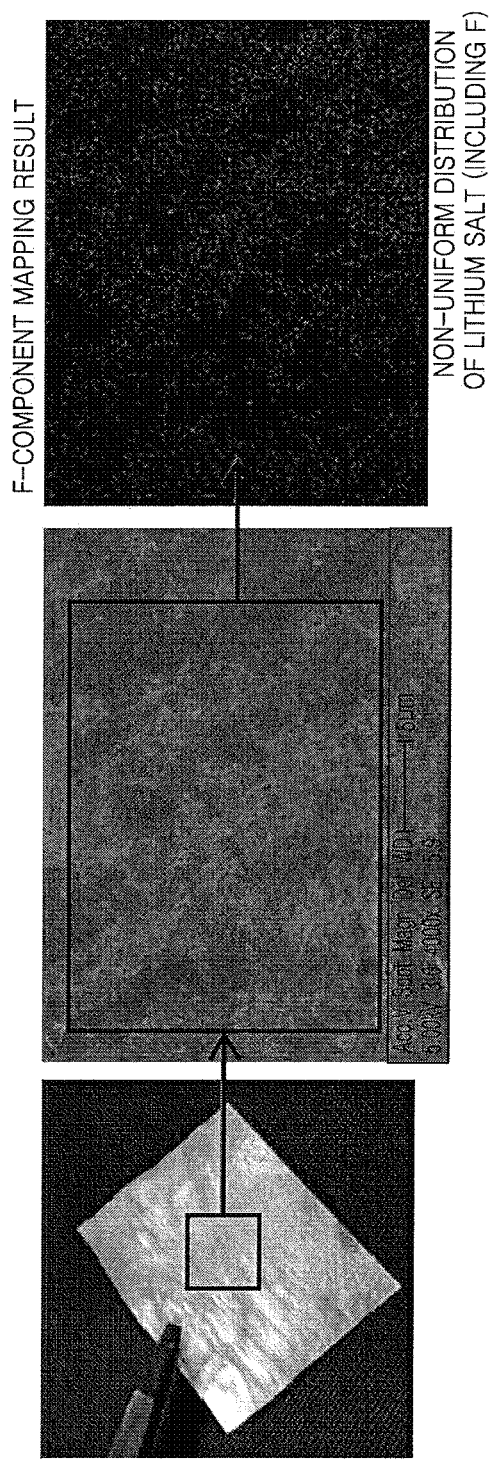
Figure 4:
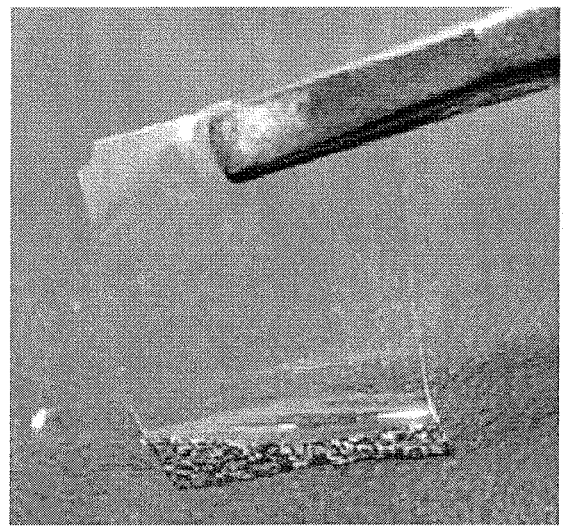
FIGS. 4 to 8 are images illustrating states of electrolytes prepared in Example 1 and Comparative Examples 1, 2, and 8 to 9, respectively.
Figure 5:
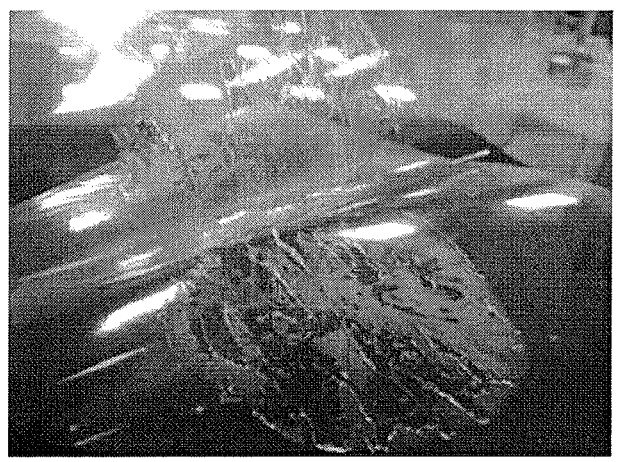
Figure 6:
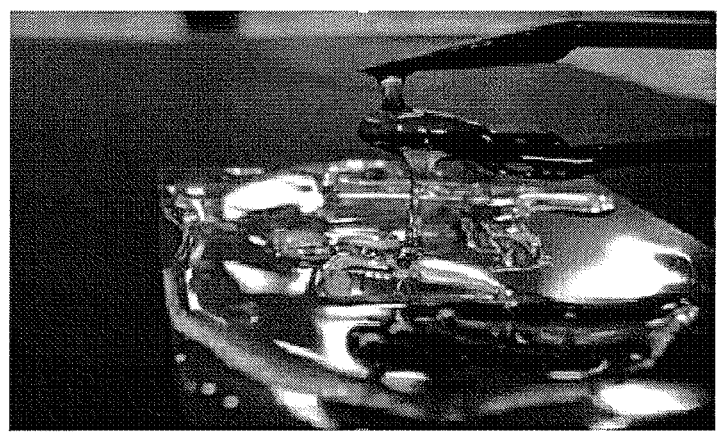
Figure 7:
Figure 8:

The mapping analysis results of the electrolytes prepared in Example 1 and Comparative Example 8 are shown in FIGS. 3A and 3B, respectively.

Referring to FIGS. 3A and 3B, the electrolyte of Example 1 was found to have a uniform distribution of the lithium salt including fluorine (F) throughout the entire electrolyte. However, the electrolyte of Comparative Example 8 was found to have a non-uniform distribution of the lithium salt, and in particular, when 5 mole % or greater of the lithium salt was added, the electrolyte was in a gel form, not solid form, and had a reduced ion conductivity.

EVALUATION EXAMPLE 6

Electrolyte State

The states of the electrolytes prepared in Example 1, Comparative Examples 1, 2, and 8 to 11 were visually examined. The results of the electrolytes prepared in Example 1, Comparative Examples 1, 2, and 8 to 9 are shown in FIGS. 4 to 8. The states of the electrolytes of Example 1 and Comparative Examples 1, 2, and 8 to 11 are represented in Table 4.

TABLE 4

| Example | Electrolyte state |
|---|---|
| Example 1 | Solid |
| Comparative Example 1 | Solid |

TABLE 4-continued

| Example | Electrolyte state |
|---|---|
| Comparative Example 2 | Solid |
| Comparative Example 8 | Gel |
| Comparative Example 9 | Gel |
| Comparative Example 10 | Gel |
| Comparative Example 11 | Gel |

The electrolytes of Example 1 and Comparative Examples 1 and 2 were found to be in a solid state, while the electrolytes of Comparative Examples 8 to 11 were in a gel state, not a solid state.

Unlike a solid electrolyte, an electrolyte in a gel form needs an additional separator to prevent a short circuit between positive and negative electrodes and malfunctioning of a battery. In addition, the gel-state electrolyte may have reduced strength, as compared with the solid-state electrolyte.

EVALUATION EXAMPLE 7

Scanning Electron Microscopy (SEM)

The electrolytes prepared in Examples 1 and 2 were analyzed by scanning electron microscopy (SEM) using an SNE-4500M/MCM-100 (available from SEC). The analysis results are shown in FIGS. 9A, 9B, 10A, and 10B.

Figure 9A:
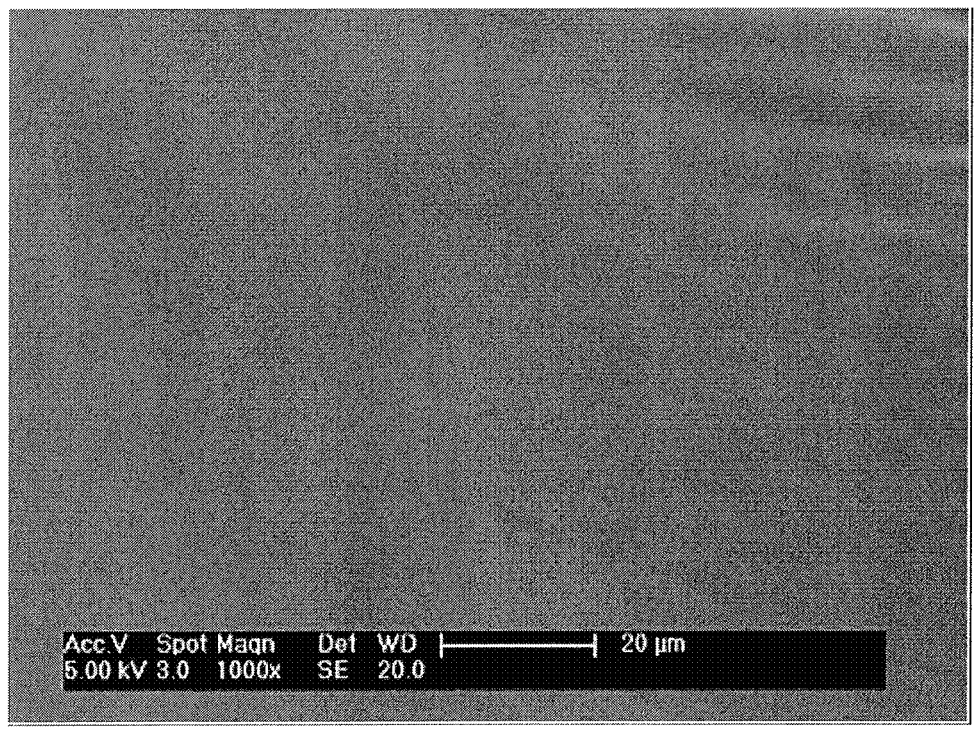
FIGS. 9A and 9B are scanning electron microscope (SEM) images of the electrolyte of Example 1.
Figure 9B:
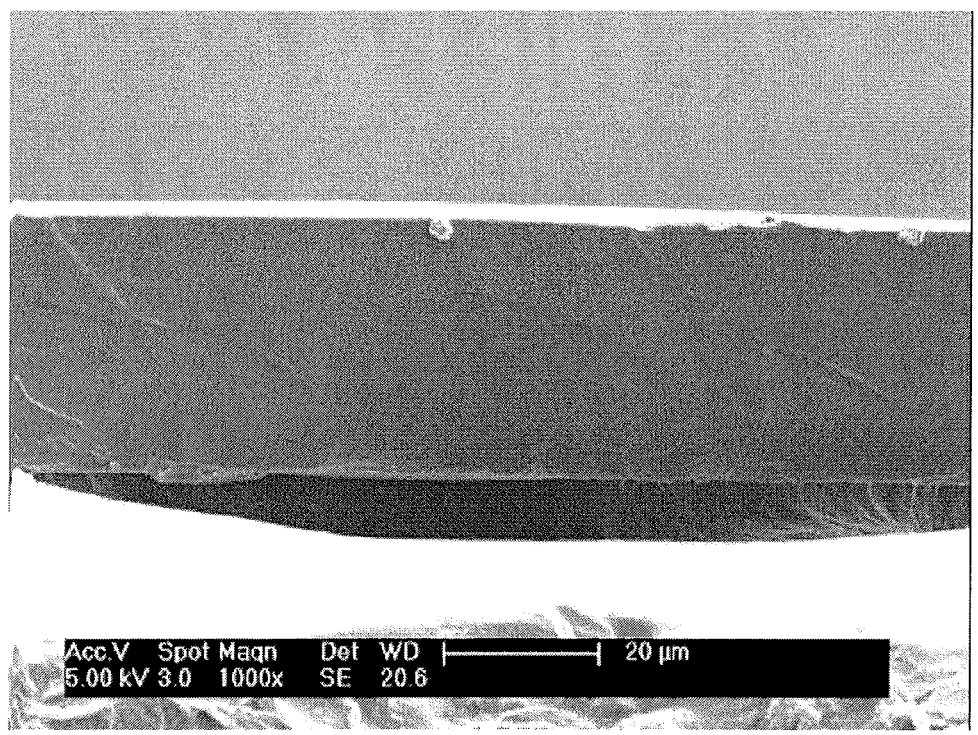
Figure 10A:
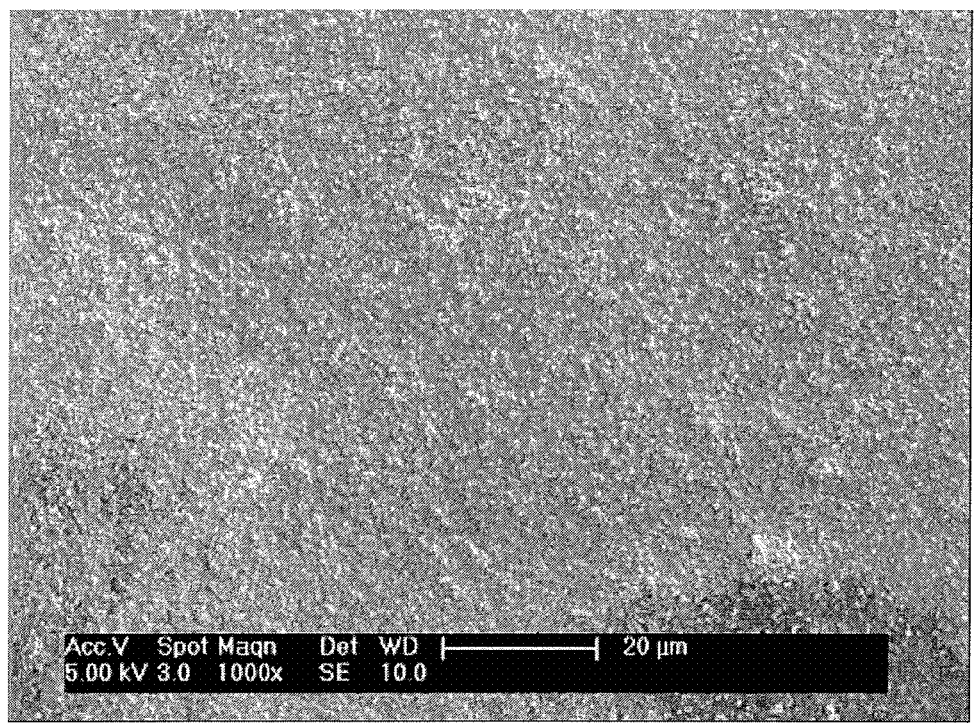
FIGS. 10A and 10B are SEM images of an electrolyte of Example 2.
Figure 10B:
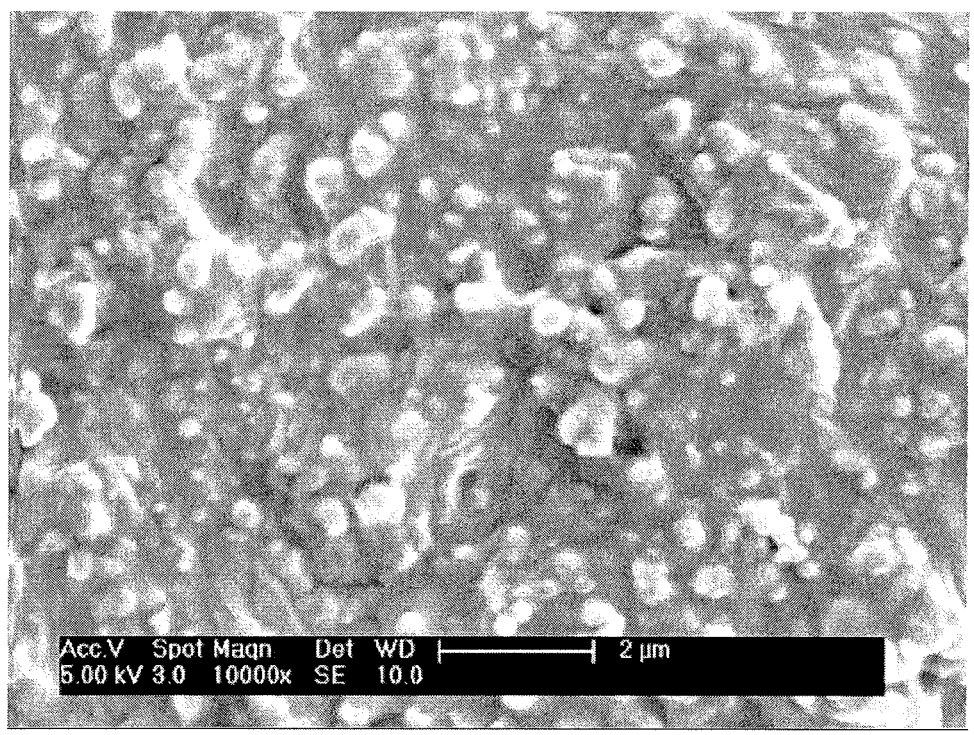

FIGS. 9A and 9B are SEM images of the electrolyte of Example 1. FIGS. 10A and 10B are SEM images of the electrolyte of Example 2.

Referring to FIGS. 10A and 10B, the electrolyte of Example 2 was found to include a portion solidified through crosslinking of triethylene glycol dimethyl ether and polyoxyethylene glycol acrylate. In comparison, unlike the electrolyte of Example 1 in FIG. 9A, the electrolyte of Example 2 was observed to include protrusions as in FIG. 10B, wherein the protrusions correspond to inorganic particles, indicating that a solid electrolyte may be secured even with use of inorganic particles.

EVALUATION EXAMPLE 8

Each of the electrolytes prepared in Examples 1 and 2 was interposed between two lithium metals to thereby manufacture lithium symmetric cells. Changes in voltage with respect to time in each of the lithium symmetric cells were observed.

The evaluation conditions were as follows: The lithium symmetric cells were manufactured as coin cells, and the electrolyte in the middle of each of the symmetric cells was charged and discharged at about 0.17 mA/cm2 for about 2 hours.

Figure 13A:
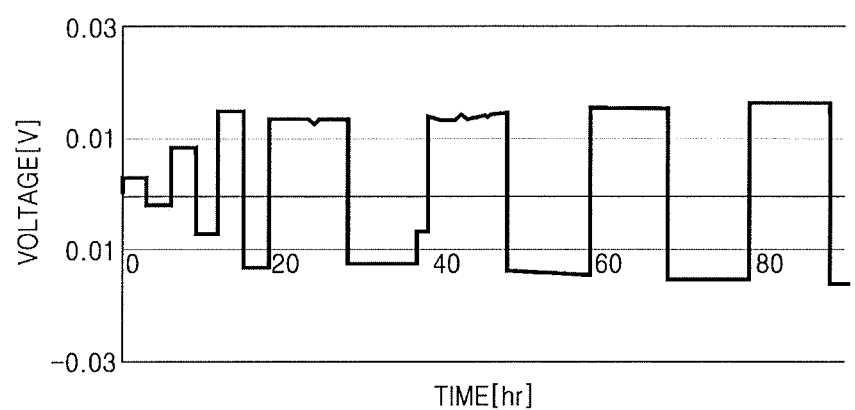
FIG. 13A is a graph illustrating changes in voltage with respect to time in a lithium symmetric cell using the electrolyte of Example 2.
Figure 13B:
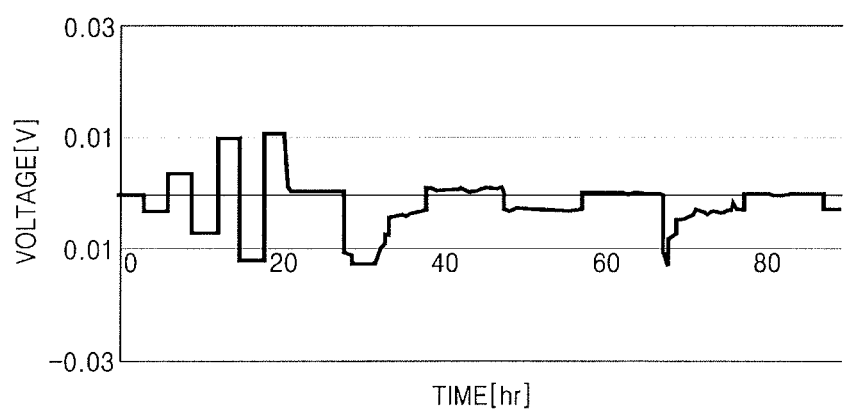
FIG. 13B is a view illustrating the electrolyte of Example 2 interposed between the lithium negative electrode and a positive electrode to suppress lithium dendrite growth on a lithium negative electrode due.
Figure 14:
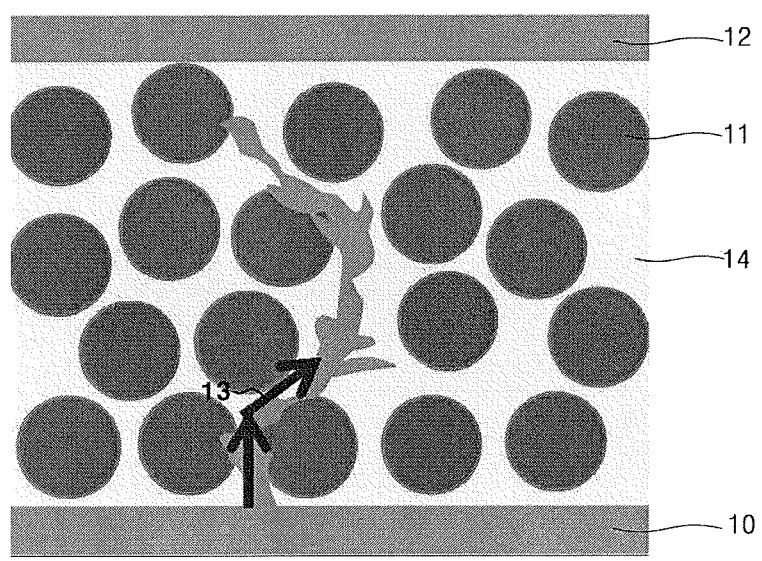
FIG. 14 is a graph illustrating changes in voltage with respect to time in a lithium symmetric cell using the electrolyte of Example 1.

Changes in voltage with respect to time in a lithium symmetric cell using the electrolyte of Example 2 are shown in FIG. 13A. Changes in voltage with respect to time in a lithium symmetric cell using the electrolyte of Example 1 are shown in FIG. 14. FIG. 13B illustrates a structure with an electrolyte 14 of Example 2 between a positive electrode 12 and a lithium negative electrode 10, wherein growth of lithium dendrite 13 on the lithium negative electrode 10 is suppressed due to the electrolyte 14 of Example 2 having improved mechanical strength by inclusion of inorganic particles 11.

Referring to FIG. 13A, it was found that the crosslinkable polymer electrolyte integrated with a ceramic delayed a short circuit during cell operation due to suppression of lithium dendrite growth by the ceramic.

As illustrated in FIG. 13B, the electrolyte of Example 2 was found to have further improved mechanical strength, as compared with the electrolyte of Example 1, such that vertical lithium dendrite growth was suppressed, due to the inclusion of inorganic particles.

A polyethylene oxide (PEO) electrolyte according to the related art operates at about 80° C. or greater, and thus a cell including the PEO electrolyte may not be properly charged and discharged at about 45° C. or less, while the electrolyte of Example 1 may be operable at about 45° C., though its polymer strength is not strong enough, and may also provide an improved effect when integrated with ceramic to implement a solid electrolyte having improved strength as prepared in Example 2.

While one or more embodiments have been described with reference to the appended drawings, it will be understood by those of ordinary skill in the art that various changes in form and details may be made therein without departing from the spirit and scope as defined by the following claims. Therefore, the scope of the disclosure is defined by the appended claims, not by the detailed description of the present disclosure.

The invention claimed is:

1. A solid electrolyte for a lithium metal battery, the solid electrolyte comprising a composite that includes:
    a glycol ether,
    a polymerization product of a crosslinkable polymer, and
    a lithium salt, wherein:
    the composite is formed by polymerizing the crosslinkable polymer after combining the crosslinkable polymer with the glycol ether and the lithium salt, and the polymerization product of the crosslinkable polymer forms a net-like matrix in which the glycol ether and the lithium salt are present.

2. The solid electrolyte of claim 1, wherein the glycol ether is at least one selected from triethylene glycol dimethyl ether, tetraethylene glycol dimethyl ether, ethylene glycol monomethyl ether (MG), diethylene glycol monomethyl ether (MDG), triethylene glycol monomethyl ether (MTG), polyethylene glycol monomethyl ether (MPG), ethylene glycol monoethyl ether (EG), diethylene glycol monoethyl ether (EDG), ethylene glycol monobutyl ether (BG), diethylene glycol monobutyl ether (BDG), triethylene glycol monobutyl ether (BTG), propylene glycol monomethyl ether (MFG), and dipropylene glycol monomethyl ether (MFDG).

3. The solid electrolyte of claim 1, wherein the crosslinkable polymer is at least one selected from polyoxyethylene glycol diacrylate and polyoxyethylene glycol dimethacrylate.

4. The solid electrolyte of claim 1, wherein an amount of the glycol ether is about 10 parts to about 80 parts by weight with respect to 100 parts by weight of the crosslinkable polymer.

5. The solid electrolyte of claim 1, further comprising ion-conductive inorganic particles.

6. The solid electrolyte of claim 5, wherein the ion-conductive inorganic particles comprise at least one selected from $Li_{1+x+y}Al_xTi_{2-x}Si_yP_{3-y}O_{12}$ (wherein $0<x<2$ and $0\leq y<3$), $BaTiO_3$, $Pb(Zr,Ti)O_3$ (PZT), $Pb_{1-x}La_xZr_{1-y}Ti_yO_3$ (PLZT) (wherein $0\leq x<1$ and $0\leq y<1$), $Pb(Mg_3Nb_{2/3})O_3$—$PbTiO_3$(PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$, wherein $0<x<2$ and $0<y<3$), lithium aluminum titanium phosphate ($Li_xAl_yTi_z(PO_4)_3$, wherein 0<x<2, 0<y<1 and 0<z<3), $Li_{1+x+y}(Al, Ga)_x(Ti, Ge)_{2-x}Si_yP_3O_{12}$ (wherein 0≤x≤1 and 0≤y≤1), lithium lanthanum titanate ($Li_xLa_yTiO_3$, wherein 0<x<2 and 0<y<3), lithium germanium thiophosphate ($Li_xGe_yP_zS_w$, wherein 0<x<4, 0<y<1, 0<z<1, and 0<w<5), a lithium nitride glass ($Li_xN_y$, wherein 0<x<4 and 0<y<2), $SiS_2(Li_xSi_yS_z$, wherein 0<x<3, 0<y<2, and 0<z<4), a $P_2S_5$ glass ($Li_xP_yS_z$, wherein 0<x<3, 0<y<3, and 0<z<7), $Li_2O$, LiF, LiOH, $Li_2CO_3$, $LiAlO_2$, a $Li_2O$—$Al_2O_3$—$SiO_2$—$P_2O_5$—$TiO_2$—$GeO_2$ ceramic, a garnet ceramic ($Li_{3+x}La_3M_2O_{12}$, wherein M is Te, Nb, or Zr, and x is an integer from 1 to 10), or a combination thereof.

7. The solid electrolyte of claim 1, wherein the lithium salt is at least one selected from LiSCN, $LiN(CN)_2$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiSbF_6$, $LiN(SO_2CF_3)_2$, $Li(FSO_2)_2N$, $LiC_4F_9SO_3$, $LiN(SO_2CF_2CF_3)_2$, $LiSbF_6$, $LiPF_3(CF_2CF_3)_3$, $LiPF_3(C_2F_5)_3$, $LiPF_3(CF_3)_3$, LiCl, LiF, LiBr, LiI, $LiB(C_2O_4)_2$, lithium difluoro(oxalato)borate (LiFOB), lithium bis(oxalato)borate (LiBOB), and a mixture thereof.

8. The solid electrolyte of claim 1, wherein an amount of the lithium salt is about 5 mol % to about 80 mol % based on a total amount of the solid electrolyte.

9. The solid electrolyte of claim 1, wherein the solid electrolyte has a porosity of about 10% or less.

10. The solid electrolyte of claim 1, wherein the solid electrolyte comprises triethylene glycol dimethyl ether, a polymerization product of polyoxyalkylene glycol acrylate, and a lithium salt.

11. The solid electrolyte of claim 1, wherein the solid electrolyte comprises triethylene glycol dimethyl ether, a polymerization product of polyoxyalkylene glycol acrylate, a lithium salt, and at least one selected from alumina, titania, and silica.

12. A lithium metal battery comprising:
a lithium negative electrode comprising a lithium metal or a lithium metal alloy;
a positive electrode; and
the solid electrolyte of claim 1 between the lithium negative electrode and the positive electrode.

13. The lithium metal battery of claim 12, wherein a separator is not present between the lithium negative electrode and the positive electrode.

14. A lithium metal battery comprising:
a lithium negative electrode comprising a lithium metal or a lithium metal alloy;
a positive electrode; and
a solid electrolyte between the lithium negative electrode and the positive electrode, the solid electrolyte comprising a composite that includes:
a glycol ether,
a polymerization product of a crosslinkable polymer, and
a lithium salt.

15. The lithium metal battery of claim 14, wherein the glycol ether is at least one selected from triethylene glycol dimethyl ether, tetraethylene glycol dimethyl ether, ethylene glycol monomethyl ether (MG), diethylene glycol monomethyl ether (MDG), triethylene glycol monomethyl ether (MTG), polyethylene glycol monomethyl ether (MPG), ethylene glycol monoethyl ether (EG), diethylene glycol monoethyl ether (EDG), ethylene glycol monobutyl ether (BG), diethylene glycol monobutyl ether (BDG), triethylene glycol monobutyl ether (BTG), propylene glycol monomethyl ether (MFG), and dipropylene glycol monomethyl ether (MFDG).

16. The lithium metal battery of claim 14, wherein the crosslinkable polymer is at least one selected from polyoxyethylene glycol diacrylate and polyoxyethylene glycol dimethacrylate.

17. The lithium metal battery of claim 14, wherein an amount of the glycol ether is about 10 parts to about 80 parts by weight with respect to 100 parts by weight of the crosslinkable polymer.

18. The lithium metal battery of claim 14, wherein the solid electrolyte further comprises ion-conductive inorganic particles.

19. The lithium metal battery of claim 18, wherein the ion-conductive inorganic particles are uniformly dispersed in the solid electrolyte.

20. The lithium metal battery of claim 14, wherein the ion-conductive inorganic particles comprise at least one selected from $Li_{1+x+y}Al_xTi_{2-x}Si_yP_{3-y}O_{12}$ (wherein 0<x<2 and 0≤y<3), $BaTiO_3$, $Pb(Zr,Ti)O_3$ (PZT), $Pb_{1-x}La_xZr_{1-y}Ti_yO_3$(PLZT) (wherein 0≤x<1 and 0≤y<1), $Pb(Mg_{1/3}Nb_{2/3})O_3$—$PbTiO_3$(PMN-PT), $HfO_2$, $SrTiO_3$, $SnO_2$, $CeO_2$, $Na_2O$, MgO, NiO, CaO, BaO, ZnO, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$, wherein 0<x<2 and 0<y<3), lithium aluminum titanium phosphate ($Li_xAl_yTi_z(PO_4)_3$, wherein 0<x<2, 0<y<1 and 0<z<3), $Li_{1+x+y}(Al, Ga)_x(Ti, Ge)_{2-x}Si_yP_{3-y}O_{12}$(wherein 0≤x≤1 and 0≤y≤1), lithium lanthanum titanate ($Li_xLa_yTiO_3$, wherein 0<x<2 and 0<y<3), lithium germanium thiophosphate ($Li_xGe_yP_zS_w$, wherein 0<x<4, 0<y<1, 0<z<1, and 0<w<5), a lithium nitride glass ($Li_xN_y$, wherein 0<x<4 and 0<y<2), $SiS_2(Li_xSi_yS_z$, wherein 0<x<3, 0<y<2, and 0<z<4), a $P_2S_5$ glass ($Li_xP_yS_z$, wherein 0<x<3, 0<y<3, and 0<z<7), $Li_2O$, LiF, LiOH, $Li_2CO_3$, $LiAlO_2$, a $Li_2O$—$Al_2O_3$—$SiO_2$—$P_2O_5$—$TiO_2$—$GeO_2$ ceramic, a garnet ceramic ($Li_{3+x}La_3M_2O_{12}$, wherein M is Te, Nb, or Zr, and x is an integer from 1 to 10), or a combination thereof.

* * * * *